United States Patent Office 3,498,811
Patented Mar. 3, 1970

3,498,811
PROCESS FOR MAKING CERTAIN MATE-
RIALS RESISTANT TO COMBUSTION GAS
DETERIORATION
Alois Kleemann, Basel, Switzerland, assignor to Geigy
Chemical Corporation, Ardsley, N.Y., a corporation of
New York
No Drawing. Continuation-in-part of application Ser. No.
459,936, May 28, 1965. This application Mar. 20, 1967,
Ser. No. 624,172
Claims priority, application Switzerland, June 2, 1964,
7,188/64; May 3, 1965, 6,130/65
Int. Cl. C08g 41/00; C08b 21/24, 21/02
U.S. Cl. 106—176                                7 Claims

ABSTRACT OF THE DISCLOSURE

Materials of cellulose esters, cellulose ethers, and polyurethane are made resistant to deterioration caused by combustion gases by treating them with certain $N^2$-substituted 2-amino-1,3,5-triazines. Gas fading of dyeings is greatly inhibited. The triazines may be incorporated during processing of the materials or by dipping the material in about 1% solutions of the triazines.

CROSS REFERENCES TO RELATED
APPLICATIONS

This application is a continuation-in-part application of our co-pending application Ser. No. 459,936 filed May 28, 1965 now U.S. 3,310,557.

The present invention concerns new $N^2$-substituted 2-amino-1,3,5-triazines, a process for the production thereof, their use for making dyeings and plastics fast to gasfading, as well as, as industrial products, the dyeings or plastics rendered fast to gas fading with the aid of these compounds.

It is known that the dyeings of cellulose esters, cellulose ethers and polyurethanes produced with certain dyestuffs undergo an undesirable change in shade in an atmosphere which contains combustion gases. It is also known that certain plastics, namely elastomeric polyurethanes are deteriorated by the attack of combustion gases, which deterioration becomes noticeable by a yellowing of these materials.

It has now been found that changes of such dyeings of cellulose esters, cellulose ethers and polyurethanes or the deterioration and particularly yellowing of elastomeric polyurethanes caused by combustion gases can be reduced or prevented entirely by applying to these materials protective amounts of $N^2$-substituted 2-amino-1,3,5-triazines of the formula

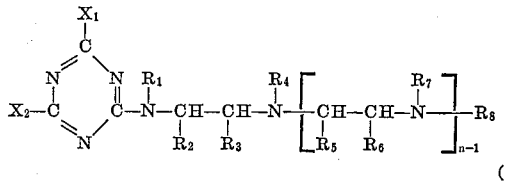

(VI)

In these formulae:

$R_1$, $R_4$ and $R_7$ each represent hydrogen or a lower alkyl or an aralkyl especially a benzyl group, or each of the pairs $R_1$ and $R_4$ or $R_4$ and $R_7$ represents an $\alpha,\beta$-lower alkylene group, especially an ethylene group, $R_2$, $R_3$, $R_5$ and $R_6$ each represent hydrogen or a lower alkyl group, or each of the pairs $R_2$ and $R_3$ or $R_5$ and $R_6$ represents an $\alpha,\delta$-n-butylene or lower alkyl-substituted $\alpha,\delta$-n-butylene group, $R_8$ represents unsubstituted aralkyl especially benzyl or aryl, especially phenyl, or an aralkyl or aryl radical substituted in the ring by non-ionic, non color imparting substituents, or it represents a cycloalkyl radical, especially cyclohexyl, $n$ represents 1 or 2, and $X_1$ and $X_2$ each independently represents chlorine or bromine or one of the radicals $R_9$, —O—$R_9$, —S—$R_9$ or

wherein $R_9$ represents an unsubstituted lower alkyl, aralkyl, especially benzyl or aryl, especially phenyl radical or an alkyl, aralkyl or aryl radical substituted by non-ionic, non-coloring substituents, or it represents a cycloalkyl radical, especially cyclohexyl, and $R_{10}$ and $R_{11}$ are hydrogen or have each the same meaning as $R_9$, and $R_{11}$ can also represent a carbacyl group, especially a lower alkanoyl group or benzoyl group.

Preferably $X_1$ and $X_2$ both represent —$HN_2$.

Active compounds according to the invention are obtained by reacting 1 mol of cyanuric chroride or bromide, in any order desired, with (a) One mol of an amine of Formula I

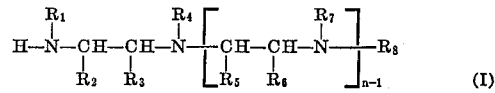

and, optionally, also (b) One mol of a Grignard compound of Formula II

wherein Hal represents chlorine, bromine or iodine, particularly bromine or iodine,
or with a compound of Formula III

or an alkali metal salt thereof,
or with a compound of Formula IV

or a water soluble salt thereof,
or with a compound of Formula V

and, optionally, further (c) With one mol of a compound of Formula II, III IV or V, to form a compound of Formula VI.

Preferably 1 mol cyanuric chloride or bromide is reacted with 1 mol of an amine of the Formula I and two mols of ammonia.

If $R_1$, $R_2$, $R_3$, $R_4$, $R_5$, $R_6$ or $R_7$ represents a lower alkyl group then it is mainly the methyl or ethyl group. If $R_1$, $R_4$ or $R_7$ represents an aralkyl group then it is preferably the benzyl group.

If each of the pairs $R_1$ and $R_4$ or $R_4$ and $R_7$ represents an $\alpha,\beta$-alkylene group, then they are chiefly the 1,2-ethylene group.

If each of the pairs $R_2$ and $R_3$ or $R_5$ and $R_6$ represents an $\alpha,\delta$-alkylene group, then this is preferably the 1,4-butylene group.

The new compounds of Formula VI are well crystallized colourless substances. They impart remarkable resistance to gas fading to cellulose ester and cellulose ether dyeings and also to plastics, chiefly elastomeric polyurethanes, which are sensitive to combustion gases.

To improve the fastness to gas fading of the dyed plastics of the types mentioned, the $N^2$-substituted 2-amino-1, 3,5-triazines according to the invention can be used before, during or after the dyeing process. Fibres or fabrics made of cellulose esters or ethers or of polyurethanes can be pretreated with a solution or dispersion of the compounds according to the invention and then dyed; also, however, the aminotriazines mentioned can be added to the dyebath, and the dyeing and making fast to gas fading can be performed in one process; finally, dyed cellulose ester, ether or polyurethane materials can also be aftertreated with solutions or dispersions of these compounds.

To protect elastomeric polyurethanes, preferably in the form of fibres such as Spandex fibres (long chain synthetic polymer containing at least 85% of polyurethane segments) from injury due to gas fading, particularly to reducing the yellowing thereof, these polyurethanes are treated with a solution or dispension of $N^2$-substituted 2-amino-1,3,5-triazines according to the invention.

The new aminotriazines of Formula VI can also be incorporated into the spinning masses.

Cellulose ester, and cellulose ether materials which have been treated with the compounds of Formula VI according to the invention are more resistant to the effect of industrial fumes, namely nitric oxides. Also elastomeric polyurethanes treated with the aminotriazines of Formula VI according to the invention are substantially protected from yellowing due to industrial fumes.

The compounds of Formula VI according to the invention barely affect the light fastness of the dyeings on the materials mentioned.

As aralkyl radical, $R_8$, $R_9$, $R_{10}$ and $R_{11}$ are mainly a benzyl radical, as aryl radical they are particularly a phenyl radical and as cycloalkyl radical they are chiefly the cyclohexyl radical.

Examples of non-ionic and non-colouring substituents in aromatic rings of $R_8$, $R_9$, $R_{10}$ and $R_{11}$ are halogen such as fluorine, chlorine or bromine, low alkyl groups such as the methyl, ethyl or butyl group or low alkoxy groups such as the methoxy, ethoxy or butoxy group or aryloxy groups.

Alkyl groups in the positions of $R_9$, $R_{10}$ and $R_{11}$ preferably contain 1–4 carbon atoms and are advantageously unsubstituted; however, if they are substituted, then the principal substituents are low alkoxy groups such as the methoxy or ethoxy group or halogens up to the atomic number 35 such as fluorine, chlorine or bromine, or the cyano group.

Examples of carbacyl groups in the position of $R_{11}$ are low alkanoyl groups such as the acetyl or propionyl group, or aroyl groups, e.g. the benzoyl group.

In preferred compounds of Formulae I and VI, each of $R_2$ and $R_3$ represents hydrogen, $R_1$ and $R_4$ together represent the 1,2-ethylene radical and $n$ is 1; or $R_2$ and $R_3$ each represents hydrogen and $R_1$ and $R_4$ each represents hydrogen or the methyl group, and $n$ is 1; in these cases, $R_8$ represents a phenyl radical optionally substituted by non-ionic and non-colouring substituents, particularly it represents the unsubstituted phenyl radical or in the second case also the benzyl radical.

$X_1$ and $X_2$ are preferably the amino group. Starting materials of Formulae I, II, III, IV and V are known or can be produced by methods known per se.

Examples of amines of Formula I are: N-cycloalkyl-ethylenediamines such as N-cyclohexyl-ethylenediamine, N-aralkyl-ethylenediamines such as N-benzyl- or N-(2, 3- or 4-methylbenzyl)-ethylenediamine, or N-aryl-ethylenediamines such as N-phenyl- or N-(2-, 3- or 4-chlorophenyl)-ethylenediamine, or N,N'-di-alkyl- (such as N, N'-dimethyl- or N,N'-diethyl-) N-cycloalkyl-ethylenediamines, N,N'-dialkyl-n-aralkyl- or -N-aryl-, particularly N-phenylethylenediamines, or 1-amino-2-N-cyclohexyl-, 1-amino-2-N-aralkyl- or 1-amino-2-N-aryl-amino cyclohexanes, or 1 - amino - 2 - (N-alkyl-N-arylamino)-cyclohexanes, in the latter case, e.g. 1-amino-2-(N-methyl-N-phenylamino)-cyclohexane, or N-cycloalkyl-, N-aralkyl- or N-aryl, then particularly N-phenyl-N'-($\beta$-alkylaminoalkyl)-piperazines, e.g. N-phenyl-N'-($\beta$-alkylaminoethyl)-piperazines.

Preferred starting materials of Formula I are N-phenyl-piperazines or N,N'-dialkyl-N-phenyl-ethylenediamines, then particularly N,N' - dimethyl - N-phenyl-ethylenediamine.

In the production of $N^2$-substituted 2-amino-1,3,5-triazines according to the invention, the triazine compound is reacted advantageously in the first step with the amine of Formula I or with the Grignard compound of Formula II, in the second step with the amine of Formula V or with the amine of Formula I, and in the third step with the hydroxy or mercapto compound of Formula III or IV.

The reaction of the triazine compound with the reaction partners as defined is performed in the first step at about 0–10° C., in the second step at about 0–60° C. and in the third step at temperatures of over 60° C.

The reaction with the Grignard compound of Formula II is performed advantageously in anhydrous, inert organic solvents, particularly those containing oxygen, such as in ether, e.g. a dialkyl ether such as diethyl ether, or a cyclic ether such as dihydrofuran.

The reaction with the amines of formula I or V is preferably performed in an organic solvent and in the presence of an agent buffering acid. Suitable solvents for the reactions are, e.g. unsubstituted or chlorinated or nitrated aromatic hydrocarbons such as benzene, toluene or xylenes, or chlorobenzene or 1,2-dichlorobenzene or nitrobenzene, or chlorinated aliphatic hydrocarbons such as tetrachloroethylene. However, the reaction can also be performed in aqueous or aqueous-organic dispersion. Mainly excess amine or alkali hydroxides such as sodium or potassium hydroxide serve as principal acid buffering agents.

Hydroxyl compounds of Formula III are preferably used in excess. If they are reacted in the first step with the cyancric chloride or bromide, the reaction is advantageously performed in the presence of agents having a weak alkaline reaction such as alkali bicarbonates; if they are reacted in the second or third step then equivalent amounts of their alkali compounds are used, e.g. the sodium or potassium alcoholates or phenolates, an excess of the organic hydroxyl compounds of Formula III advantageously serving as solvent or flux.

If mercapto compounds of Formula IV are used, then advantageously equivalent amounts of their alkali metal salts in organic solution are used. Organic solvents which are advantageously used for this purpose are water soluble alcohols, i.e. low alkanols such as methanol or ethanol, or alkylene glycol monoalkyl ethers such as ethylene glycol monomethyl ether.

The following examples illustrate the invention. The temperatures are in degrees centigrade. C.I. means Color Index, published by the Society of Dyers and Colourists, Dean House, Piccadilly, Bradford, Yorkshire, England, with acknowledgement to the American Association of Textile Chemists and Colorists, Lowell, Mass., U.S.A., "abs." means absolute.

EXAMPLE 1

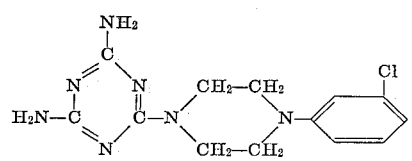

Cyanuric chloride is converted into 2,4-diamino-6-chloro-1,3,5-triazine with ammonia by methods known per se.

29 g. of 2,4-diamino-6-chloro-1,3,5-triazine and 43 g. of N-(3-chlorophenyl)-piperazine in 600 ml. of ethanol are refluxed. After the original alkaline reaction has disappeared, 26 g. of concentrated sodium hydroxide solution are added to the mixture dropwise. The mixture again reacts alkaline to phenolphthalein. It is refluxed for another half hour, then filtered and the filtrate is cooled. The product which crystallises out is filtered off and washed with a little ethanol. According to elementary analysis by combustion the compound is that of the formula given above. This substance melts with 1 mol of crystal alcohol at 186°.

The end product gives cellulose acetate dyeings good resistance to gas fading.

If in the above example, instead of the 43 g. of N-(3-chlorophenyl)-piperazine, the equivalent amounts of one of the amines given in column II of the following Table 1 are used, then compounds having similar activity are obtained.

TABLE 1

| Ex. No. | II amine | III M.P. of end product (deg.) |
|---|---|---|
| 2 | N-(4-chlorophenyl)-piperazine | 240 |
| 3 | N-(3,4-dichlorophenyl)-piperazine | 224 |
| 4 | N-(2-fluorophenyl)-piperazine | 186 |
| 5 | N-(3-fluorophenyl)-piperazine | 220 |
| 6 | N-(4-fluorophenyl)-piperazine | 231 |
| 7 | N-(3-bromophenyl)-piperazine | 182 |
| 8 | N-(3-iodophenyl)-piperazine | ¹ 134 |
| 9 | N-(3-trifluoromethylphenyl)-piperazine | 159 |
| 10 | N-(3-trifluoromethyl-4-chlorophenyl)-piperazine | 198–200 |
| 11 | N-(2-methylphenyl)-piperazine | ¹ 136 |
| 12 | N-(3-methylphenyl)-piperazine | 201 |
| 13 | N-(4-methylphenyl)-piperazine | 219 |
| 14 | N-(4-phenoxyphenyl)-piperazine | 164 |
| 15 | N-(4-phenylthiophenyl)-piperazine | ¹ 100–105 |
| 16 | N-naphthyl-(1)-piperazine | 225 |
| 17 | N-cyclohexyl-piperazine | 205 |
| 18 | N-benzyl-piperazine | 178–180 |

¹ Decomposition.

EXAMPLE 19

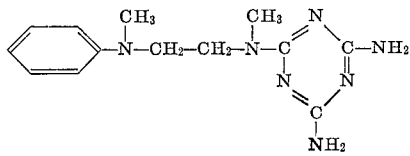

29 g. of 2,4-diamino-6-chloro-triazine (produced by reacting cyanuric chloride with ammonia in the known manner) are suspended in 600 ml. of ethanol and 38 g. of N-phenyl-N,N'-dimethyl-ethylenediamine are added. The mixture is then refluxed. As soon as the alkaline reaction of the mixture can only be determined on litmus paper, 26 g. of concentrated sodium hydroxide solution are added dropwise while stirring. The reaction mixture is then boiled until it becomes clear. While still hot, precipitated sodium chloride is filtered off. On cooling the filtrate, the compound of the above formula crystallises out. It melts at 175–177° and gives cellulose acetate dyeings good resistance to gas fading.

EXAMPLE 20

If in Example 19, instead of the 38 g. of N-phenyl-N,N'-dimethyl-ethylene-diamine, the equivalent amount of N - phenyl - N,N',N'' - trimethyl - diethylenetriamine is used, then by the procedure given in the example, the compound of the formula

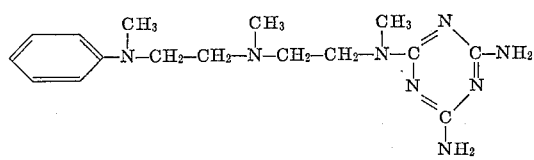

is obtained, M.P. 133–134°. It also gives cellulose dyeings good fastness to gas fading.

By repeating Example 19, but using instead of the aforesaid diamine an equivalent amount of N¹-phenyl-diethylenetriamine, there is obtained the compound of the formula

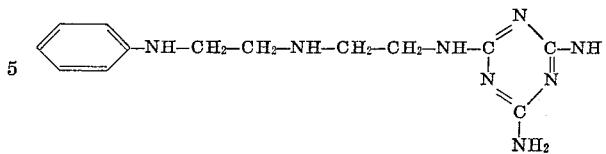

By repeating Example 19, but using instead of the aforesaid diamine an equivalent amount of the triamine of the formula

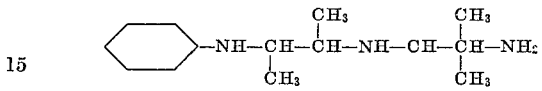

or the triamine of the formula

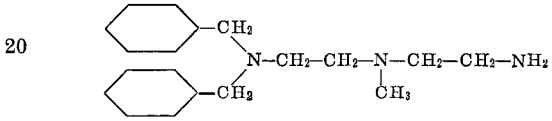

the correspondingly substituted melamine compounds falling under Formula VI are obtained.

EXAMPLE 21

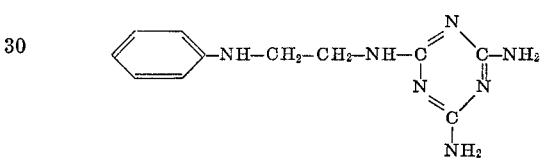

30 g. of N-phenyl-ethylenediamine are added to a suspension of 29 g. of 2,4-diamino-6-chloro-triazine in 550 ml. of ethanol, and the mixture is refluxed. As soon as the strong alkaline reaction of the mixture becomes weaker, 26 g. of concentrated sodium hydroxide solution are added dropwise while stirring whereupon the mixture is refluxed until all organic material has dissolved. While still hot, sodium chloride is filtered off. On cooling, the compound of the above formula crystallises out of the filtrate. It melts at 180–181° and it makes cellulose acetate dyeings which are susceptible to gas fading more resistant to industrial fumes.

EXAMPLE 22

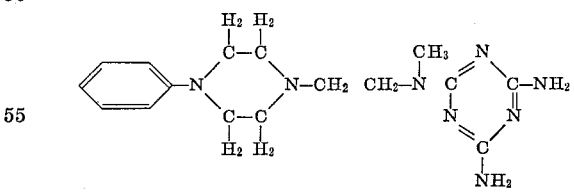

22 g. of 2,4-diamino-6-chloro-triazine are suspended in 300 ml. of dioxan. 37 g. of N-phenyl-N'-(β-methylaminoethyl)-piperazine are added to this suspension and the whole is refluxed while stirring. When the reaction mixture has only a slightly alkaline reaction, 20 g. of concentrated sodium hydroxide solution are added dropwise. The mixture is heated until the reaction is completed. The precipitated sodium chloride is then filtered off and the filtrate is concentrated whereupon the compound of the above formula crystallises out. This compound melts at 241° and gives cellulose acetate dyeings good resistance to gas fading.

If instead of the 37 g. of N-phenyl-N'-(β-methylaminoethyl)-piperazine, the equivalent amount of one of the amines mentioned in column II of the following Table 2 is used and otherwise the procedure given in the example is followed, then compounds having similar activity are obtained.

TABLE 2

| Ex. No. | Amine | II | III M.P. of end product (deg.) |
|---|---|---|---|
| 23 | N-[β-(phenylmethylamino)-ethyl]-piperazine | | 138–140 |
| 24 | 1-amino-2-(N-methyl-N-phenylamino)-cyclohexane | | 188 |
| 24a | 4-phenyl-2,3-tetramethyleno-piperazine | | |

EXAMPLE 25

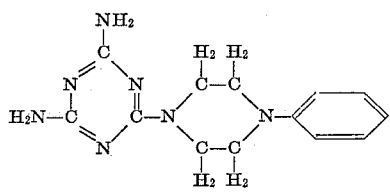

A solution of 330 g. of N-phenyl-piperazine in 1500 ml. of benzene is added dropwise while stirring well at 10° to a solution or 184 g. of cyanuric chloride in 1500 ml. of benzene. The reaction mixture is then filtered, the filtrate is concentrated under reduced pressure and cooled. The N-[2,4-dichloro-1,3,5-triazinyl-(6)]-N'-phenyl-piperazine which precipitates is filtered off, washed with a little benzene and reacted with alcoholic ammonia solution at 140° under pressure.

The end product of the above formula melts at 193° and gives cellulose acetate dyeings which are sensitive to industrial fumes a noticeable resistance to gas fading.

EXAMPLE 26

184 g. of cyanuric chloride are dissolved in 1500 ml. of benzene. A solution of 400 g. of 3-chlorophenyl-piperazine in 1500 ml. of benzene is added dropwise at 10° while stirring. A precipitate soon forms. On completion of the dropwise addition, the mixture is stirred for another hour and then filtered. On concentrating the filtrate, N-[2,4-dichloro-1,3,5-triazinyl-(6)]-N-(3-chlorophenyl)-piperazine is obtained. On reacting this compound with alcoholic ammonia solution as described in Example 25, the end product of the formula given in Example 1 is obtained.

EXAMPLE 27

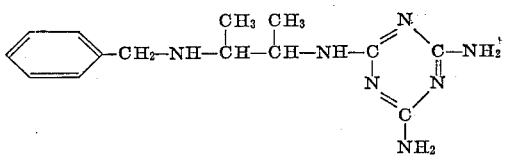

29 g. of 2,4 - diamino - 6 - chloro - 1,3,5 - triazine, produced according to Example 1, are suspended in 600 ml. of ethanol and 40 g. of 2-benzylamino-3-aminobutane are added while stirring. The reaction mass is then brought to the boil and 26 g. of concentrated sodium hydroxide solution are slowly added dropwise. On completion of this addition, the mixture is boiled until it has only a weakly alkaline reaction to litmus paper. Undissolved sodium chloride is then filtered off hot. After evaporating off the solvent in vacuo, the compound of the above formula is obtained.

If in the above example, equivalent amounts of 2-benzyl - amino - 3 - aminopropane, 2 - benzylamino-3-(β-ethylamino)-amino-butane or 2-amino - 3-(N'-benzyl-ethylenediamino)-butane are used then compounds giving similar fastness to gas fading are obtained.

EXAMPLE 28

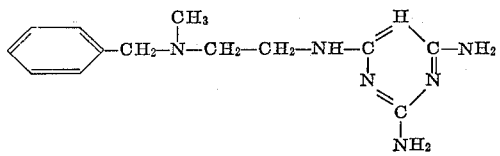

37 g. of N-benzyl-N-methyl - ethylenediamine are added to a suspension of 29 g. of 2,4-diamino-6-chloro-1,3,5-triazine, produced according to Example 1, in 500 ml. of butanol. The reaction mixture is brought to the boil and 26 g. of concentrated sodium hydroxide solution are slowly added dropwise so that the mass always has phenolphthalein alkaline reaction. On completion of the addition, boiling is continued until the reaction of the mixture is only alkaline to litmus paper. All organic substance has then been dissolved. Precipitated sodium chloride is then filtered off and the filtrate is evaporated to dryness in vacuo. The compound of the above formula is obtained in this way.

If in the above example, equivalent amounts of N,N-dibenzyl - N' - methyl - ethylenediamine, N - benzyl-N-methyl - N' - methyl - ethylenediamine or N,N'-dibenzyl-N-ethyl ethylenediamine are used then reaction products which give the same good fastness to gas fading are obtained.

EXAMPLE 29

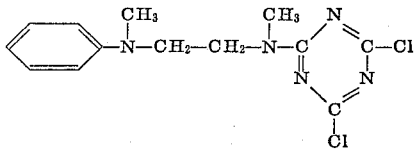

37 g. of cyanuric chloride are dissolved in 300 ml. of benzene and the solution is cooled to 8–10°. The solution of 66 g. of N,N'-dimethyl-N-phenyl-ethylenediamine in 300 ml. of benzene is added dropwise thereto at 8° while stirring. A precipitate soon forms. On completion of the dropwise addition, the reaction mixture is stirred for 2 hours at room temperature. The precipitate is then filtered off under suction, washed with a little benzene and the filtrate is concentrated in vacuo to half its volume. After standing for a few hours, the end product crystallises out. It has the above formula. It is filtered off under suction and dried in vacuo at 70°. The product melts at 118–120°. It gives cellulose acetate and cellulose ether dyeings good resistance to industrial fumes.

End products having a similar action are obtained if, instead of the 37 g. of cyanuric chloride, equimolar amounts of cyanuric bromide are used with otherwise the same procedure.

If, instead of the 66 g. of N,N'-dimethyl-N-phenyl-ethylenediamine, equimolar amounts of the compounds listed below are used and otherwise the procedure given in the example is followed, then end products are also obtained which make cellulose acetate dyeings resistant to industrial fumes.

(a) N,N'-dimethyl-N-(2-, 3- or 4- methylphenyl)-ethylenediamine
(b) N-(2-, 3- or 4- chlorophenyl)-ethylenediamine
(c) N,N'-diethyl-N-phenyl-ethylenediamine
(d) 1-amino-2-(N-methyl-N-phenylamino)-cyclohexane
(e) N-phenyl-N'-(β-methylaminoethyl)-piperazine
(f) N,N'-dimethyl-N-cyclohexyl-ethylenediamine
(g) N,N'-dimethyl-N-benzyl-ethylenediamine
(h) N,N'-dimethyl-N-(2-, 3- or 4- chlorobenzyl)-ethylenediamine (i) N,N'-dibenzyl-ethylenediamine
(k) N,N-dibenzyl-N'-methyl-ethylenediamine
(l) N,N-di(β-phenyl-ethyl)-N'-methyl-ethylenediamine
(m) 4-phenyl-2,3-di-isopropyl-piperazine
(n) 4-phenyl-1-(β-methylaminoethyl)-2-methyl-piperazine
(o) N-(4-methyl-benzyl)-N-methyl-ethylenediamine
(p) N-(4-chloro-methyl-benzyl)-N-methyl-ethylenediamine

EXAMPLE 30

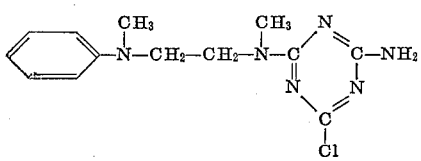

The solution of 29 g. of the amino dichlorotriazine in 200 ml. of ethanol obtained according to Example 29 is saturated with 20 g. of ammonia and heated in an autoclave for 3 hours at 60°. The precipitate formed is then filtered off under suction and recrystallised from methanol. In this way the end product of the above formula is obtained, M.P. 150°. It gives elastomeric polyurethane good resistance to industrial fumes.

If instead of 20 g. of ammonia, equimolar amounts of the following amines are used, then with otherwise the same procedure, end products which can give fastness to industrial fumes are obtained.

(a) Methylamine
(b) Ethylamine
(c) Dimethylamine
(d) β-Cyanethylamine
(e) Cyclohexylamine
(f) Benzylamine
(g) 4-methylbenzylamine
(h) 2-methylphenylamine

EXAMPLE 31

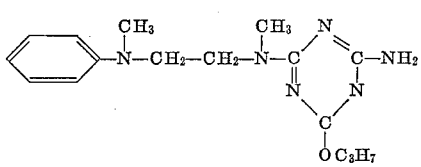

44 g. of the diamino chlorotriazine produced according to Example 30 are added to a solution of 3.4 g. of sodium in 350 ml. of abs. n-propanol. The mixture is then refluxed for 3 hours, in which the minosa alkaline reaction disappears and a precipitate of sodium chloride is formed. The sodium chloride is filtered off from the hot mixture and the filtrate is evaporated to dryness in vacuo. The residue is recrystallised from n-hexane. The end product of the above formula is obtained, M.P. 93°, which gives elastomeric polyurethane good fastness to industrial fumes.

End products also giving good fastness to industrial fumes are obtained if, instead of n-propanol, equimolar amounts of one of the organic hydroxy compounds given below is used and otherwise the same procedure as given in the example is followed.

(a) Methanol
(b) Ethanol
(c) Ethyleneglycol monomethyl ether
(d) Cyclohexanol
(e) Benzyl alcohol
(f) 2-methylbenzyl alcohol
(g) Phenol
(h) 4-methylphenol

EXAMPLE 32

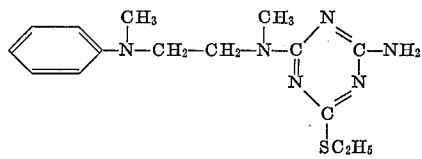

3.4 g. of sodium are dissolved in 250 ml. of abs. n-propanol. A solution of 10 g. of ethyl mercaptan in 100 ml. of abs. propanol is added to this solution. 44 g. of the diamino chlorotriazine produced according to Example 30 are added to this mixture and the mixture is boiled for 2 hours until the reaction mass no longer has a minosa alkaline reaction. The precipitated sodium chloride is then filtered off and the filtrate is evaporated to dryness in vacuo. The residue is recrystallised from cyclohexane. The end product of the above formula is obtained in this way, M.P. 97°. It gives cellulose acetate and cellulose ether dyeings good fastness to gas fading.

If, instead of 10 g. of ethyl mercaptan, equimolar amounts of one of the mercaptans listed below are used, then with otherwise the same procedure, end products which give good fastness to gas fading are also obtained.

(a) Methyl mercaptan
(b) Propyl mercaptan
(c) Isopropyl mercaptan
(d) β-Methoxyethyl mercaptan
(e) Cyclohexyl mercaptan
(f) Benzyl mercaptan
(g) 2-methylbenzyl mercaptan
(h) Phenyl mercaptan
(i) 4-methylphenyl mercaptan

EXAMPLE 33

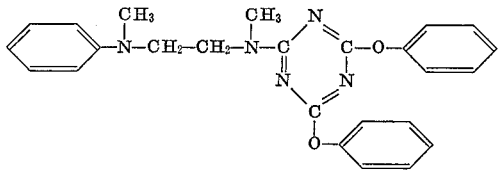

6.9 g. of sodium are dissolved in 350 ml. of abs. ethanol. 28 g. of phenol and 46 g. of the amino dichlorotriazine obtained according to Example 29 are added to this solution. The reaction mixture is then boiled for 4 hours during which time sodium chloride precipitates. The sodium chloride is filtered off and the filtrate is allowed to cool whereupon the end product of the above formula crystallises out. It is filtered off under suction and dried in vacuo at 70°.

It gives cellulose acetate dyeing good fastness to gas fading.

End products which also give good fastness to gas fading are obtained by replacing the 28 g. of phenol by equimolar amounts of one of the organic hydroxyl compounds mentioned in Example 3 under (a), (b), (c), (d), (e), (f) or (h).

EXAMPLE 34

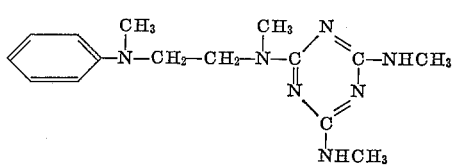

36 g. of N,N'-dimethyl-N-phenyl-ethylenediamine, 600 ml. of ethanol and 35 g. of 2,4-bis-(N-methylamino)-6-chlorotriazine, produced by reacting cyanuric chloride with 2 mols of methylamine, are boiled together. When the mixture no longer has a phenol-phthalein alkaline reaction, 26 g. of sodium hydroxide solution are slowly added dropwise thereto. After boiling for 6 hours, the mixture has a neutral reaction. Precipitated sodium chloride is filtered off and the filtrate is evaporated to dryness in vacuo. An oil remains which slowly solidifies. It is crystallised from methanol and so the end product of the above formula is obtained, M.P. 125°. It gives cellulose acetate and cellulose ether dyeings good fastness to industrial fumes.

EXAMPE 35

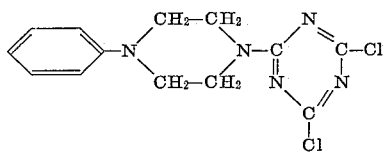

184 g. of cyanuric chloride are dissolved in 1500 ml. of benzene and the solution is cooled to 8–10°. The solution of 350 g. of N-phenyl piperazine in 1500 ml. of benzene is added dropwise to the stirred mixture at 8° over a period of 2–3 hours. A precipitate is formed. The temperature is then allowed to rise to about 20° and the mixture is stirred at this temperature. The precipitate is then filtered off under suction, washed with a little benzene and the filtrate is concentrated in vacuo at 60° to a volume of about 800 ml. After allowing to stand a little, the end product of the above formula separates out of the filtrate in the form of beautiful crystals. It melts at 162°.

This compound gives cellulose acetate dyeing good fastness to gas fading.

End products which also give good fastness to gas fading are obtained if, in the above example, instead of the 350 g. of N-phenyl piperazine, equimolar amounts of one of the compounds listed below are used and otherwise the procedure given in the example is followed.

(a) N-(2-, 3- or 4-methylphenyl)-piperazine
(b) N-benzyl piperazine
(c) N-cyclohexyl piperazine
(d) N-(N-phenyl-N-methyl-aminoethyl)-piperazine If, in the above example, cyanuric bromide in benzene solution is reacted with N-phenyl piperazine or with equimolar amounts of the bases listed above, then substituted amino dibromotriazines having a similar action are obtained.

EXAMPLE 36

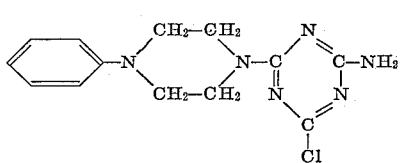

31 g. of the amino dichlorotriazine obtained according to Example 35, 200 ml. of ethanol and 20 g. of gaseous ammonia are heated in an autoclave for 3 hours at 60°. On completion of the reaction, the precipitate formed is filtered off, it is taken up in hot benzene, the hot benzene solution is filtered and the filtrate allowed to cool. The compound of the above formula precipitates in the form of fine crystals. This compound melts at 193°. The product gives good fastness to gas fading to elastomeric polyurethane.

Compounds which also give good fastness to gas fading are obtained if the 20 g. of ammonia used are replaced by equimolar amounts of one of the amines given in Example 30 under (a)–(h).

EXAMPLE 37

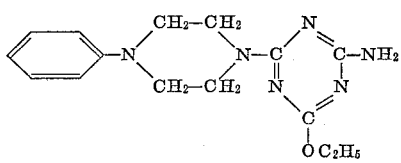

3.4 g. of sodium are dissolved in 300 ml. of abs. ethanol and then 44 g. of the diamine chlorotriazine obtained according to Example 36 are added to this solution. A clear solution is obtained. This solution is then refluxed for 4 hours during which the mimosa alkaline reaction gradually disappears and a precipitate of sodium chloride is formed. The hot solution is then filtered. On cooling, the compound of the above formula crystallises from the filtrate. It is filtered off under suction, washed with a little methanol and dried in vacuo at 70°. It melts at 140°. It gives cellulose acetate dyeings good resistance to industrial fumes.

Compounds which also give good fastness to industrial fumes are obtained if the 300 ml. of ethanol are replaced by equimolar amounts of one of the organic hydroxyl compounds given in Example 31 under (a) and (c)–(h).

EXAMPLE 38

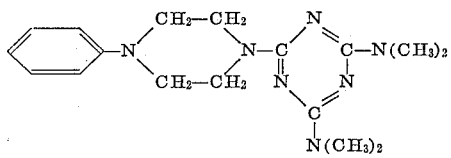

36 g. of N-phenyl piperazine are dissolved in 1000 ml. of ethanol. 40 g. of 2,4-bis-dimethylamino-6-chloro-1,3,5-triazine, produced by reacting cyanuric chloride with dimethylamine, are then added to the solution and the whole is boiled while stirring. As soon as the reaction mixture has a neutral reaction, 26 g. of concentrated sodium hydroxide solution are slowly added dropwise.

The mixture is then further boiled until it again has a neutral reaction. The sodium chloride which has precipitated is filtered off from the hot solution. On cooling, the end product of the above formula crystallises from the filtrate. It melts at 156° and gives good fastness to industrial fumes.

If in the above example, instead of 2,4-bis-dimethyl-amino-6-chloro-1,3,5-triazine, equimolar amounts of 2,4-bis-benzylamino-6-chlorotriazine or 2,4-bis-cyclohexyl-amino-6-chlorotriazine are used then products are obtained which give similar fastness to industrial fumes.

EXAMPLE 39

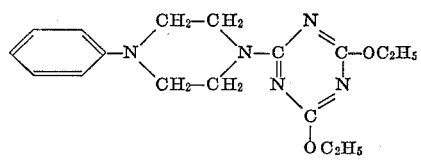

6.9 g. of sodium are dissolved in 350 ml. of ethanol. 46 g. of the amino dichlorotriazine obtained according to Example 35 are then added and the mixture is refluxed for 4 hours. During this time, a precipitate of sodium chloride forms. The mixture is filtered and the filtrate cooled whereupon the end product of the above formula crystallises out. It is filtered off under suction and dried in vacuo at 70°. The end product gives cellulose acetate dyeings good resistance to gas fading.

EXAMPLE 40

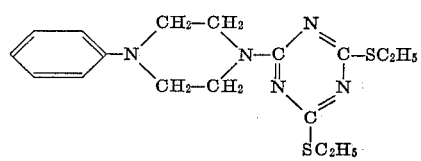

6.9 g. of sodium are dissolved in 250 ml. of propanol and the solution of 20 g. of ethyl mercaptan in 200 ml. of propanol is added 46 g. of the amino dichlorotriazine obtained according to Example 35 are then added to the mixture and the whole is boiled for 4 hours. Sodium chloride precipitates which is filtered off. On cooling the filtrate the end product of the above fromula crystallises out. It is filtered off under suction, washed with a little ethanol and dried in vacuo at 70°.

It makes cellulose acetate and cellulose ether dyeings resistant to gas fading.

EXAMPLE 41

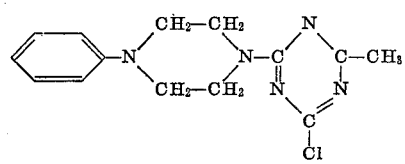

33 g. of 2-methyl-4,6-dichloro-1,3,5-triazine (produced according to USP 1,911,689) are dissolved in 200 ml. of benzene. The solution of 64 g. of N-phenyl-piperazine in 50 ml. of benezene is added dropwise to this solution at room temperature while stirring. A slightly exothermic reaction takes place immediately and a precipitate is formed. The reaction temperature is kept to 20° by cooling with ice water. On completion of the dropwise addition, the mixture is heated to 30° within half an hour and it is then filtered. The filtrate is evaporated to dryness and the residue is recrystallized from cyclohexane. In this way the end product of the above formula is obtained, M.P. 136°. It gives cellulose acetate dyeings good resistance to gas fading.

If instead of the 64 g. of N-phenyl piperazine, equimolar amounts of one of the compounds mentioned in Example 29 under (a) to (h) or in Example 35 under (a) to (d) are used and otherwise the procedure given in this example is followed, then end products which also give good fastness to gas fading are obtained.

Compounds which also give good fastness to gas fading are obtained if, in the present example, instead of the 33 g. of 2-methyl-4,6-dichloro,1,3,5-triazine, equimolar amounts of one of the following compounds are used and otherwise the procedure given in the example is followed.

(a) 2-ethyl-4,6-dichloro-1,3,5-triazine
(b) 2-cyclohexyl-4,6-dichloro-1,3,5-triazine
(c) 2-benzyl-4,6-dichloro-1,3,5-triazine
(d) 2-phenyl-4,6-dichloro-1,3,5-triazine
(e) 2-methyl-4,6-dibromo-1,3,5-triazine
(f) 2-(β-methoxy-ethyl)-4,6-dichloro-1,3,5-triazine

EXAMPLE 42

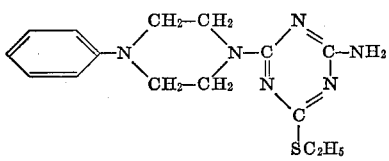

3.4 g. of sodium are dissolved in 250 ml. of propanol, the solution of 10 g. of ethyl mercaptan in 100 ml. of propanol is added and 44 g. of the diamino chlorotriazine obtained according to Example 36 are added. The whole is then refluxed until the reaction mixture no longer has a mimosa alkaline reaction. Precipitated sodium chloride is then filtered off. The end product of the above formula crystallises out of the filtrate. The crystals are filtered off under suction and dried in vacuo at 70°. The substance melts at 158°.

It gives cellulose ether dyeings good fastness to gas fading.

EXAMPLE 43

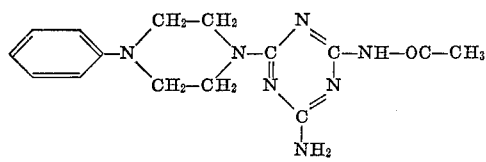

5.9 g. of acetamide are dissolved in 100 ml. of abs. toluene. This solution is added dropwise, while stirring, to the suspension of 2.3 g. of pulverised sodium in 100 ml. of abs. toluene, the addition being made at room temperature. The whole is stirred until all the sodium has disappeared. This suspension is then added dropwise at room temperature to the solution of 29 g. of 2-phenyl-piperazinyl-4-amino-6-chloro-1,3,5-triazine in 150 ml. of abs. toluene. To complete the reaction, the mixture is finally heated to 50–60°. The sodium chloride formed is then filtered off. The filtrate is evaporated to dryness in vacuo whereupon 2-[(4'-phenyl-piperazinyl-(1'))]-4-amino-6-acetamido-1,3,5-triazine of the above formula is obtained.

If in the above example, equimolar amounts of benzoic acid amide are used instead of acetamide, the corresponding benzoylamido triazine derivatives are obtained.

EXAMPLE 44

Cellulose diacetate fabric is pre-treated for 30 minutes at 40° with an aqueous-ethanolic dispersion which contains 0.7% (calculated on the weight of the fabric) of the compound according to Example 25 and 1% of the condensation product of cetyl alcohol and 20 mol of ethyleneoxide. An aqueous dispersion of 0.1% of the dyestuff C.I. Disperse Blue 3 (61,505), 0.05% of the dyestuff C.I. Disperse Red 31 (11250) and 0.125% of the dyestuff 3-(4'-acylaminobenzene)-azo-4-hydroxy-1-methylbenzene is added to this application bath.

The treatment bath is then heated from 40° to 80° within 30 minutes and kept for another 45 minutes at this temperature. The sample is then rinsed and dried.

As a comparison, another sample of the same cellulose acetate fabric is dyed with the same dyestuffs in the same way as described above but without the auxiliary according to Example 25.

The dyed samples, together with a test fabric (Gas fading control sample No. 1 of Test Fabrics Inc., 55, Vandam St., New York, N.Y.) are placed in a container and exposed to the fumes of a gas flame at 40–45° while excluding light (American Standard Method L 14–54, 1951) until the test fabric has changed from blue to red.

After exposure, the fabric treated with the compound according to Example 25 shows practically no change in shade whereas the shade of the comparative sample is very greatly changed. If in the above example the compound of Example 34 is used, a similar good fastness of the dyeing is obtained.

EXAMPLE 45

A solution of 15 g. of cellulose diacetate, 0.15 g. of the compound according to Example 25, and 0.03 g. of 1-phenylamino-4-amino-anthraquinone in 100 ml. of acetone is drawn into sheets of about 0.2 mm. thickness.

As a comparison, corresponding sheets are produced without the compound according to Example 25. Samples of these sheets together with an untreated test fabric (Gas fading control sample No. 1) are exposed to the fumes of an open gas flame under the same conditions as given in Example 44.

After exposure, the sheet containing the compound according to Example 25 shows no change in shade whereas the sample without this substance has changed strongly from blue to pink.

EXAMPLE 46

Yarn consisting of elastomeric polyurethane fiber (spandex fibers) commercially available under the trademark Lycra is impregnated at 20° in a 1%-solution of the compound according to Example 22 in isopropanol. The yarn is squeezed out to 100% by weight and dried at 50–60°.

If this yarn is tested in the gas fading test according to the standard procedure DIN54,025 (testing with dilute nitrous fumes) it turns considerably less yellow than untreated spandex yarn.

If in the above example the compound of Example 30 is used, a similar good fasteness of the material is obtained.

What is claimed is:

1. A process for making material of cellulose esters, or cellulose ethers, or of polyurethane, resistant to deterioration due to combustion gases which comprises, applying to said material a solution containing at least about 1% of a compound of the formula:

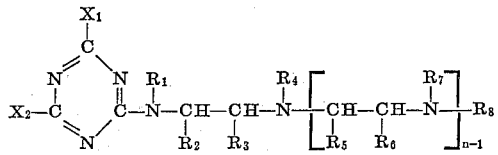

wherein:

$n$ represents 1 or 2, each of $R_1$, $R_2$, $R_3$, $R_5$ and $R_6$, taken independently, is a member selected from the group consisting of hydrogen and lower alkyl, each of $R_4$ and $R_7$ taken independently is a member selected from the group consisting of hydrogen, lower alkyl and phenyl-lower alkyl, each of the pairs $R_1$ and $R_4$ taken together and $R_4$ and $R_7$ taken together represents an $\alpha,\beta$-alkylene group of from 2 to 8 carbon atoms, and each of the pairs $R_2$ and $R_3$ taken together and $R_5$ and $R_6$ taken together represents an $\alpha,\delta$-n-butylene radical.

$R_8$ represents a member selected from the group consisting of phenyl-lower alkyl, lower alkyl-phenyl-lower alkyl, halogen-phenyl-lower alkyl, phenyl, halogen-phenyl, lower alkyl-phenyl, trifluoromethyl-phenyl, phenoxy-phenyl, phenylthio-phenyl, naphthyl and cyclohexyl, each of $X_1$ and $X_2$ represents a member selected from the group consisting of chlorine, bromine, a radical $R_9$, a radical —O—$R_9$, a radical —S—$R_9$, and a radical

wherein:

$R_9$ is a member selected from the group consisting of lower alkyl, cyclohexyl, benyl, lower alkyl-benzyl, phenyl, lower-alkyl phenyl, lower alkoxy-lower-alkyl, $R_{10}$ is a member selected from the group consisting of hydrogen and lower alkyl, and $R_{11}$ is a member selected from the group consisting of hydrogen, lower alkyl and lower alkanoyl.

2. A process as claimed in claim 1 wherein said material is cellulose diacetate.

3. A process as claimed in claim 1 wherein elastomeric polyurethane fiber material is treated with a solution of a compound of the formula:

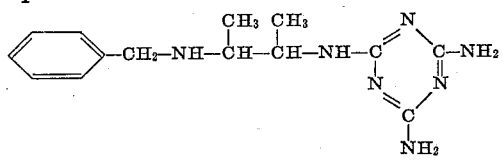

4. Cellulose ester material to which there has been applied a solution containing at least 1% of a compound of the formula

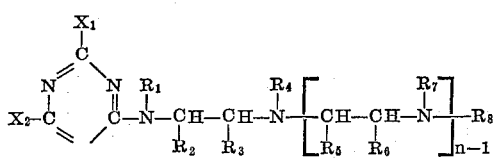

wherein:

$n$ represents 1 or 2, each of $R_1$, $R_2$, $R_3$, $R_5$ and $R_6$, taken independently, is a number selected from the group consisting of hydrogen and lower alkyl, each of $R_4$ and $R_7$ taken independently is a member selected from the group consisting of hydrogen, lower alkyl and phenyl-lower alkyl, each of the pairs $R_1$ and $R_4$ taken together and $R_4$ and $R_7$ taken together represents an $\alpha,\beta$-alkylene group of from 2 to 8 carbon atoms, and each of the pairs $R_2$ and $R_3$ taken together and $R_5$ and $R_6$ taken together represents an $\alpha,\delta$-n-butylene radical, $R_8$ represents a member selected from the group consisting of phenyl-lower alkyl, lower alkyl-phenyl-lower alkyl, halogeno-phenyl-lower alkyl, phenyl, halogeno-phenyl, lower alkyl-phenyl, trifluoromethyl-phenyl, phenoxy-phenyl, phenylthio-phenyl, naphthyl and cyclohexyl, each of $X_1$ and $X_2$ represents a member selected from the group consisting of chlorine, bromine, a radical $R_9$, a radical —O—$R_9$, a radical —S—$R_9$, and a radical

wherein:

$R_9$ is a member selected from the group consisting of lower alkyl, cyclohexyl, benzyl, lower alkyl-benzyl, phenyl, lower-alkyl phenyl, lower alkoxy-lower-alkyl, $R_{10}$ is a member selected from the group consisting of hydrogen and lower alkyl, and $R_{11}$ is a member selected from the group consisting of hydrogen, lower alkyl and lower alkanoyl.

5. Cellulose ester materials as defined in claim 4 wherein said compound is of the formula:

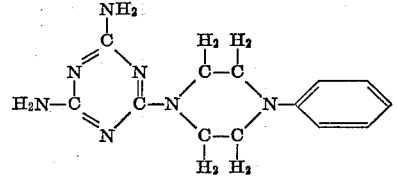

6. Polyurethane ester material to which has been applied a solution containing at least 1% of a compound of the formula:

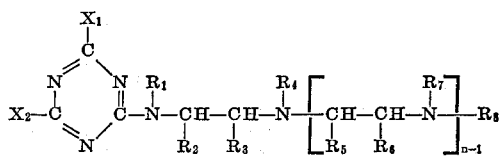

wherein:

$R_1$, $R_4$ and $R_7$ are hydrogen, lower alkyl, or aralkyl, or each of the combination of $R_1$ and $R_4$ and $R_4$ and $R_7$ are $\alpha,\beta$-lower alkylene groups;

$R_2$, $R_3$, $R_5$ and $R_6$ are an $\alpha,\delta$-n-butylene or lower alkyl-substituted $\alpha,\delta$-n-butylene group;

$R_8$ is an unsubstituted aralkyl, aryl, or an aralkyl or aryl radical substituted in the ring by non-ionic, non-color imparting substituents, or cycloalkyl;

$n$ is 1 or 2;

$X_1$ and $X_2$ each independently are chlorine, bromine, or one of the radicals $R_9$, —O—$R_9$, —S—$R_9$, or

wherein:

$R_9$ is lower alkyl, aralkyl, aryl, or alkyl, aralkyl, or aryl radicals substituted by non-ionic, non-color imparting substituents of cycloalkyl;

$R_{10}$ and $R_{11}$ are hydrogen or the same as $R_9$; and $R_{11}$ is also carbacyl.

7. Polyurethane ester material as defined in claim 6 wherein said compound is of the formula:
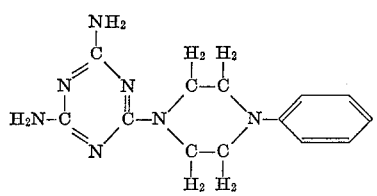
References Cited
UNITED STATES PATENTS
| | | | |
|---|---|---|---|
| 3,023,129 | 2/1962 | Shivers | 260—45.8 |
| 3,118,887 | 1/1964 | Hardy et al. | 106—176 |
| 3,310,557 | 3/1967 | Kleeman | 260—45.8 |
ALLAN LIEBERMAN, Primary Examiner
U.S. Cl. X.R.
8—17, 61, 74, 133; 117—138.8, 144; 260—45.8